Sept. 15, 1936.   F. SANDELL   2,054,138
VALVE REMOVING TOOL
Filed April 27, 1935
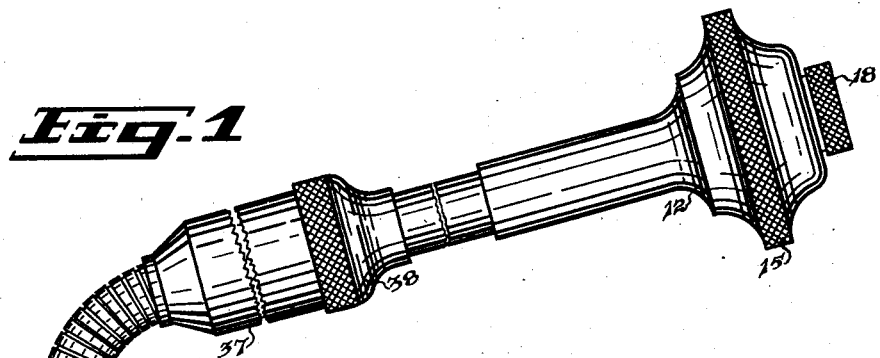
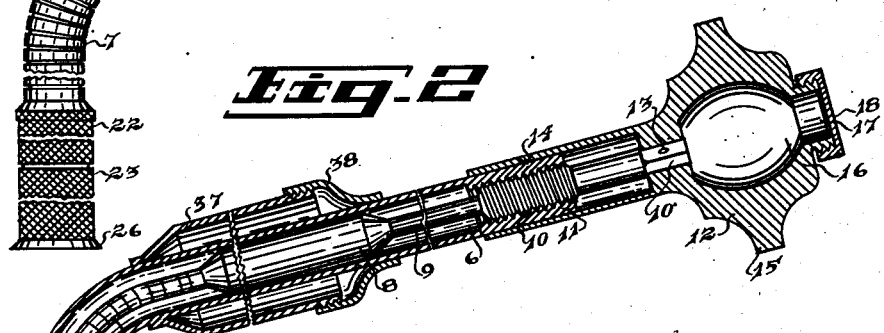
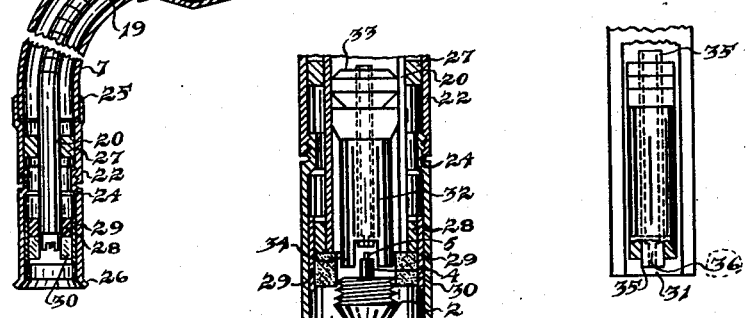
Inventor;
Frederick Sandell
By Leland S. Mitchell
Attorney.

Patented Sept. 15, 1936

2,054,138

UNITED STATES PATENT OFFICE 2,054,138

VALVE REMOVING TOOL

Frederick Sandell, St. James, Manitoba, Canada

Application April 27, 1935, Serial No. 18,570

6 Claims. (Cl. 81—177)

My invention relates to valve removing tools, more particularly having reference to a device for unthreading and removing a valve from the valve casing of a motor vehicle tire.

One of the objects of my invention is to provide a tool for the removal of valves from valve casings of motor vehicle tires or tubes, and for analogous purposes; the device including impelling mechanism for the projection and retraction, with simultaneous rotation, of a valve engaging member, by which a valve may be engaged and unthreaded from a valve casing.

A further object of the invention is to include with the mechanism for unthreading the valve, means for engagement thereof whereby the same may be lifted by the tool from the valve casing.

The invention contemplates provision of a casing, which may include a flexible section, and a working assembly within the casing for unthreading a valve from a valve casing. Said assembly includes a screw threaded connection with the casing and is adapted to be manually manipulated, by which an endwise shifting movement may be imparted to the working assembly in relation to the casing under rotary movement of said assembly. The assembly further includes a valve engaging member removably carried thereby, and resilient members for engagement of the valve whereby on completion of the unthreading operation the same may be lifted from its casing.

To this end there is provided the novel construction and arrangement of parts as hereinafter more particularly described and claimed, reference being had to the accompanying drawing wherein like characters of reference are used to indicate like parts throughout the several views, and wherein:—

Fig. 1 is a side view of the device assembled, the same, for convenience of illustration, being shown with parts broken away.

Fig. 2 is a similar view of the device but with the casing and certain parts shown longitudinally sectioned to disclose the working assembly, and also disclosing the interior of the magazine.

Fig. 3 is a detail fragmentary view showing the housing for the work engaging part of the assembly, the same being shown in engagement with a valve casing, the former being sectioned and the latter broken away to disclose the working parts, a valve being shown partly removed from the valve casing.

Fig. 4 is a side view of the lower end of the casing with valve engaging member inserted.

The valve removing tool is designed primarily for use with motor vehicle tires, more particularly tires of a character wherein a pneumatic filler is provided with a valve casing in which a valve with associated parts is threaded.

Having reference to the drawing there is shown a valve casing 1 of a type common in the art, said casing being internally threaded for reception of the threaded plug 2 of a valve, generally indicated by the numeral 3. The valve includes a lug or lugs 4 with stem 5.

For removal of the valve from the casing 1 I provide a tool by which the valve may be engaged and unthreaded, and then withdrawn from the casing. This tool includes a tubular main casing 6 which may include a flexible extension section 7, and within the casing a working assembly.

Said assembly comprises an intermediate barrel section 8 slidable within the casing and dimensioned to intimately contact the casing walls to provide the necessary stability in operation of the assembly. At the upper end of section 8 is a shank 9, including a threaded portion 10 engageable in an internally threaded section 11 of the casing 6, by which rotation of the shank would cause relative opposite endwise shifting movement as between shank and casing.

The shank 9 further includes a squared end section 10' receivable within a complementary opening formed in a head 12 and adapted to be secured therein by a removable transverse pin 13. The head 12 includes an attached or integral sleeve 14 within which the upper end portion of the main casing is loosely receivable.

The head 12 further includes an annular knurled portion 15 for its convenient manual manipulation. Within the head is a hollow portion or chamber 16 for spare parts, as hereinafter referred to, said chamber including a suitable opening for access thereto, said opening being externally defined by a neck or flange 17 on which is threaded a closure cap 18.

To the lower end of the barrel section 8 is secured a flexible section 19, to the free end of which attaches a tube 20 in which a valve engaging member 32 may be secured.

The free end of the flexible section 7 has attached thereto a housing formed of mating sections 22 and 23, said sections being threaded together, the one having an annular flange 24 threaded for engagement within the other section. The upper end of section 22 provides a flange 25 for reception of the end of the flexible section 7 and attachment thereto, and the lower end of section 23 is flared, as indicated at 26, to facilitate engagement over the end of the valve casing 1.

The tube 20 is centrally located or positioned within the housing formed by the sections 22 and 23 by a guide ring 27, the tube being slidable in said ring. There is further provided a lower guide ring 28 carried by a tubular section 29 loose within the housing section 23. Said section 29 is formed to fit in sufficiently intimate contact with the housing section to frictionally engage therewith and hold the ring 28 in position, but is also removable therefrom.

To the ring 28 attaches an annular resilient member 30, formed of rubber or similar material and adapted to be pressed into engagement with the threaded plug 2 of the valve 3, so that the valve, when unthreaded, may be lifted out of the valve casing.

The tube 20 is formed with an elongated opening in one side, as indicated at 31, (see Fig. 4) whereby a valve engaging member 32 may be inserted within said tube. The member 32 includes a head 33 by which said member may be removably secured within the tube. For this purpose the tube 20 may be provided with an inner form complementary to the head 33 and in which said head may be inserted, or the head may be secured by any other suitable means, but detachable therefrom.

The member 32 further includes a bifurcated end 34 engageable with the lug 4 on the valve for unthreading the valve from the casing 1. Said member is also provided with a central bore in which is secured a tube 35 of rubber or similar resilient material, said tube including an end portion having a reduced bore as indicated at 36, engageable with the stem 5 of valve 3 to assist the member 30 in suspending the valve when unthreaded from the valve casing.

The casing 6 has a magazine 37 secured thereto in which spare valves may be carried. Said magazine may be closed by a cover 38 slidable on the casing 6 and threaded on the marginal portion of the magazine.

As previously indicated the ring 28, section 29 and member 30 are united to form a unitary assembly of parts and for convenience spare assemblies of this character may be carried within the chamber 16 in the head 12.

In the operation of the device rotation of the head 12 serves to rotate the working assembly formed by the shank 9, barrel 8, flexible section 19, tube 20 and valve engaging member 32 and, by virtue of the threaded engagement of the shank 9 with the main casing 6, said assembly may be propelled longitudinally of the casing, by which the member 32 may be projected or retracted and a valve engaged thereby and unthreaded from a valve casing, or screwed into a casing.

At the same time the member 30 engages the plug 2 of the valve, while the end portion 36 of tube 35 engages the stem 5, to suspend the valve from the lower end of the working assembly. Either of the members 30 or 35 would normally be sufficient for the suspension of the valve. It is of importance that the valve be lifted with reasonable care from the valve casing, for which reason the guide ring 27 and in addition the lower guide ring 28 are provided, serving to stabilize movement of the tube 20.

For insertion or removal of the valve engaging member 32 in the tube 20, it is necessary to remove the lower housing section 23 and shift the working assembly to bring the opening 31 below the section 22, permitting the member 32 being moved laterally in or out of its place within said tube.

The use of a flexible extension 7 on the casing 6, and a corresponding flexible section 19 on the working assembly, would not always be required, particularly in a tool for use in conjunction with a valve casing arranged outwardly inclined relative to the plane of the wheel on which the tire is mounted as is done in certain instances.

The invention may be embodied in other specific forms without departing from the spirit or essential attributes thereof, and the present embodiment is to be considered in all respects as illustrative and not restrictive, reference being had to the appended claims to indicate the scope of the invention.

Having thus described and ascertained the nature of my invention what I claim is:—

1. A valve removing tool comprising a casing, a working assembly in the casing, said assembly including a head at one end for its manual manipulation and a valve engaging member at the other end, and means for effecting endwise shifting movement of the working assembly with respect to the casing on rotation of the assembly, said means including a threaded engagement between a portion of the assembly and the casing.

2. A device as defined in claim 1 including relative flexible sections in the casing and working assembly.

3. In a tool for removing valves from a valve casing, a valve engaging member, said member including a central bore, and a tube in said bore, said tube including an end portion formed of resilient material and adapted by expansion and contraction of the material to be forced into gripping engagement with a valve stem for suspension of the valve.

4. In a valve removing tool a casing, a working assembly mounted to be rotated within the casing, said assembly and casing including relative flexible sections, means for imparting endwise shifting movement to the assembly by relative rotation of the assembly and casing, and means for stabilizing movement of the assembly, said means being in the form of a barrel section incorporated therein, the peripheral portion of said barrel section being adapted for intimate sliding contact with the casing wall.

5. In a valve removing tool a main casing, a working assembly mounted to be rotated within the casing, said assembly including a tubular member at its working end and a member mounted therein adapted for engagement of the lugs on a valve for unthreading the valve from its casing, means for imparting endwise shifting movement to the assembly by relative rotation of the assembly and main casing, a housing on the casing wherein the tubular member is constrained to travel, said housing including guide means for directing movement of said member axially of the housing, and means for engagement of the valve when said valve has been unthreaded from its casing.

6. In a valve tool including a member for unthreading a valve from its seat, said member including a central bore, a rubber tube in said bore, the bore of said tube being adapted to receive and engage a valve stem.

FREDERICK SANDELL.